Nov. 5, 1946.  C. CHRISTIANSEN  2,410,567
TRACTOR MOUNTED LOADER
Filed July 24, 1944  3 Sheets-Sheet 1

Inventor
C. Christiansen,
By William T. Deier
Attorney

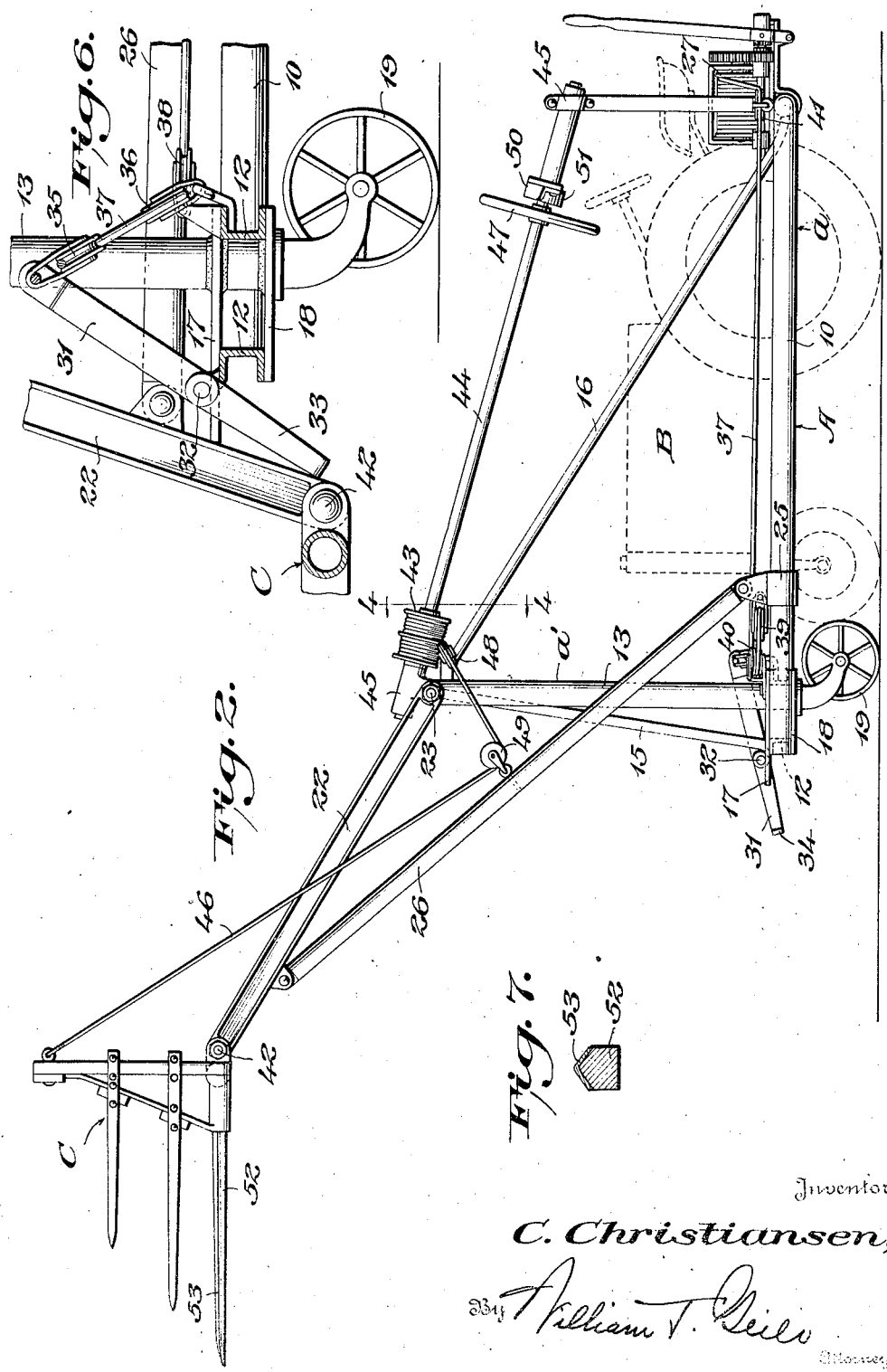

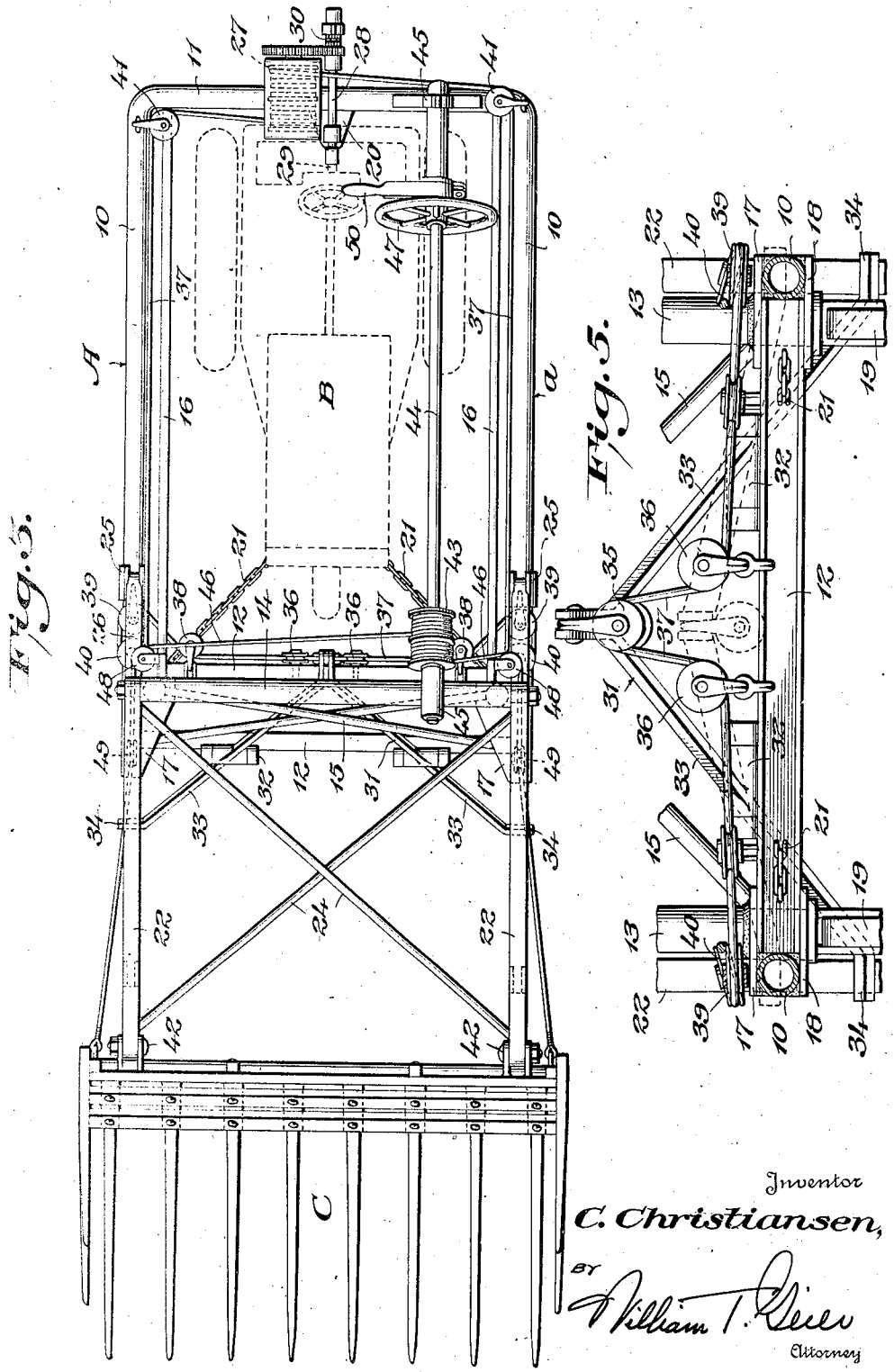

Patented Nov. 5, 1946

2,410,567

UNITED STATES PATENT OFFICE 2,410,567

TRACTOR MOUNTED LOADER

Christian Christiansen, St. Cloud, Minn.

Application July 24, 1944, Serial No. 546,339

10 Claims. (Cl. 214—140)

This invention relates to farming machinery, and has particular reference to a machine for gathering, lifting, transferring and stacking or dumping various different farm products and materials such, for example, as hay, corn, manure, vegetables and the like.

Generally speaking, the object of the invention is to provide a simple, practical machine which is designed to be power driven by a tractor for the purpose of expediting the handling of farm products and materials, such as those mentioned, and which is thoroughly reliable and efficient in operation.

With the foregoing general object in view, the invention consists in a machine embodying the novel features of construction, combination and arrangement of parts as will be hereinafter more fully described, illustrated in the accompanying drawings and defined in the appended claims.

In the accompanying drawings, wherein like characters of reference denote corresponding parts in the different views:

Figure 2 is a view similar to Figure 1 showing the material gathering scoop element in an elevated position.

Figure 3 is a top plan view of the machine as the same is shown in Figure 2.

Figure 5 is an enlarged transverse section on the line 5—5 of Figure 1.

Figure 6 is an enlarged, central, longitudinal section through the lower front portion of the machine, and Figure 7 is a transverse section through one of the scoop or fork tines of the machine.

Figure 1:
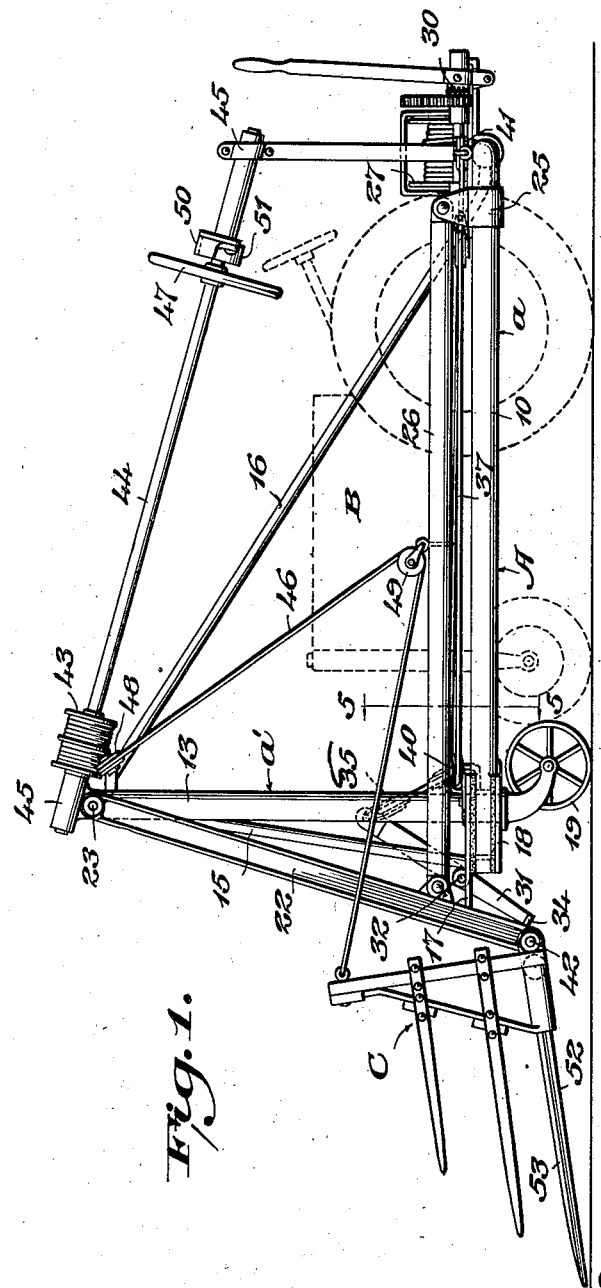
Figure 1 is a side elevation of a material handling machine constructed in accordance with one practical embodiment of the invention, the material gathering scoop element being shown in its lowermost position.
Figure 4:
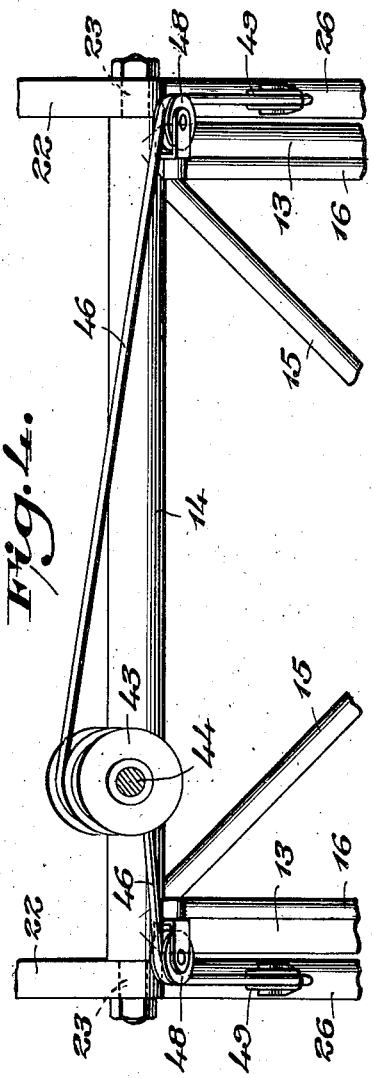
Figure 4 is an enlarged transverse section on the line 4—4 of Figure 2.

Referring to the drawings in detail, it will be observed that the present machine includes a frame, designated generally as A, and that said frame comprises a horizontally disposed rectangular bottom portion, designated generally as $a$, and an upright, rectangular front end portion rigid with said bottom portion and designated generally as $a'$.

The frame bottom portion $a$ comprises a pair of spaced apart, parallel side rails 10, 10, a cross rail 11 rigidly connecting said side rails together at their rear ends, and a pair of cross rails 12, 12 spaced apart longitudinally of said frame and rigidly connecting said side rails together adjacent to their front ends. Similarly, the upright, front end portion $a'$ of said frame comprises a pair of parallel vertical posts 13, 13 rigid with and rising from said frame bottom portion $a$ near the front end thereof and rigidly connected together at or near their upper ends by a cross bar 14.

The frame portions $a$ and $a'$ may be fabricated in any suitable manner from any suitable material such, for example, as metal tubing, channel-iron, angle-iron, I-iron, wood, or a combination of such materials, and are shown in the present instance as being fabricated from a combination of metal tubing and channel-iron elements, the side rails 10, 10, the cross rail 11, the parts 13 and the cross bar 14 being in the form of metal tubing and the cross rails 12, 12 being in the form of channel-iron elements. In any event, the frame upright portion $a'$ preferably is braced in upright position by front and rear brace rods 15 and 16, respectively, extending diagonally between the upper part thereof and front and rear parts, respectively, of the frame bottom portion $a$.

The posts 13, 13, may be secured at or near their lower ends to the frame bottom portion $a$ in any suitable manner. In this connection and as illustrated in the present instance, upper and lower plates 17 and 18 are welded to the side rails 10 and the cross rails 12, 12 at the front corners of the frame bottom portion $a$ and the lower end portions of the posts 13, 13, extend through said plates and are welded thereto.

At its front end, the frame A is supported at a suitable elevation above the ground by a pair of wheels 19, 19, which preferably are swiveled to enhance the maneuverability of the machine, the castors for these wheels being journaled, for example, in the lower end portions of the posts 13, 13.

The frame bottom portion $a$ is of a size to accommodate a tractor B, and at its rear end is adapted to be supported at a suitable elevation above the ground by the tractor to which it may be connected in any suitable manner. For example, the rear cross rail 11 may be provided with a plate 20 for connection with the usual rear draft bar of the tractor frame, thus not only to provide for supporting the rear end of the machine upon the tractor, but to provide a draft connection between the machine and the tractor for driving the former by the latter. In this connection, in order to maintain the machine alined with respect to the tractor and, at the same time, to provide for vertical flexibility between the machine and the tractor, the front part of the frame A may be bridled to the front part of the tractor by diagonal chains or other suitable connecting elements 21.

Disposed in laterally spaced apart relationship to each other at the outer sides of the upright portion a' of the frame A is a pair of arms 22, 22 which, at corresponding ends thereof, are suitably pivoted to said frame portion a' at or near the upper end thereof, as indicated at 23, and which, at their other or free ends, have pivotally connected thereto a load carrier, designated as C, which may be in the form of either a scoop or a rake as shown.

Preferably the arms 22, 22 are connected together and braced by suitable elements such as the diagonal cross rods designated as 24. In any event, said arms 22, 22, are swingable about their pivots 23 between lowered, downwardly and forwardly inclined positions relative to the frame A, as illustrated in Figure 1, and raised, upwardly and forwardly inclined positions relative to said frame A, as illustrated in Figure 2. In their lowered positions, said arms are held against rearward movement relative to the frame A by suitable stop means carried by said frame, said stop means being comprised, for example, by the plates 17.

The side rails 10, 10, of the frame portion a constitute track elements extending longitudinally relative to said frame at the sides thereof, and have slidably engaged therewith, for free longitudinal movement therealong, slide elements 25, 25, respectively, to which are pivotally connected the rear ends of a second pair of arms 26, 26, respectively, the front ends of which are pivotally connected to the arms 22, 22, respectively, near the free ends thereof. The lengths of the side rails or track elements 10, 10 and of the arms 26, 26 are such that when the arms 22, 22 are in their lowered positions, as shown in Figure 1, the slide elements 25, 25 are disposed near the rear ends of said side rails or track elements 10, 10, and when said arms 22, 22 are disclosed in their raised positions, as shown in Figure 2, said slide elements are disposed near the front ends of said side rails or track elements 10, 10. Thus, when the arms 22, 22 are in their lowered positions, forward sliding movement of the slide elements 25, 25 along the side rails or track elements 10, 10, will cause the arms 26, 26 to act as push rods to raise said arms 22, 22. On the other hand, when said arms 22, 22 are in their raised positions, lowering of the same may be controlled by controlling rearward sliding movement of the slide elements 25, 25, along the side rails or track elements 10, 10.

The machine includes drum and cable means power operable by the tractor B for effecting forward sliding movement of the slide elements 25, 25, to raise the arms 22, 22 and manually controllable to control rearward sliding movement of said slide elements to control lowering of said arms 22, 22. The drum of said means is designated as 27, and may appropriately be mounted on the rear cross rail 11 of the lower portion a of the frame A in a position such that a drive shaft 28 therefor may be connected to the usual power take-off shaft 29 of the tractor B when the frame A is operatively associated with the tractor. Moreover, the connection between the drive shaft 28 and the drum 27 may include a suitable clutch 30 and, if desired, a suitable brake, so that application of power to the drum, and cable unwinding rotation thereof, may be controlled at will.

A lever 31 of inverted V-shape is pivoted intermediate its ends, as indicated at 32, to the forwardmost cross rail 12 of the lower frame portion a for swinging movement between a substantially vertically disposed position, as shown in Figure 1, and a substantially horizontally disposed position, as shown in Figure 2, and includes a pair of downwardly diverging arms 33, 33, having out-turned lower end portions 34, 34, respectively, which are disposed rearwardly of and in the plane of the arms 22, 22, respectively.

When the arms 22, 22 are in their lowermost positions and the lever 31 is in its substantially vertically disposed position, the out-turned portions 34, 34, of the arms 33, 33 are disposed either in engagement with or closely adjacent to the rear faces of the arms 22, 22 near the free ends thereof. Consequently, if, under such conditions, the upper end portion of the lever 31 is rotated downwardly and rearwardly, the consequent forward and upward rotation of its lower end portion will result in the out-turned portions 34 of its arms 33 initiating forward and upward swinging movement of the arms 22, 22.

Carried by the upper end portion of the lever 31 is a sheave 35, while carried by the rear cross rail 12 of the lower frame portion a is a pair of sheaves 36, 36 which are disposed, one to either side of the sheave 35, at a level suitably lower than said sheave 35 when the lever 31 is in its substantially vertically disposed position.

The medial portion of a cable 37 extends over the sheave 35 and from the latter its two reaches extend beneath and outwardly from the sheaves 36, 36 respectively. Consequently, when a pulling force is exerted upon the said reaches of said cable, the sheave 35 is pulled downwardly and the lever 31 thereby is rotated in a direction to cause its lower end portion to swing forwardly and upwardly and to initiate forward and upward swinging movement of the arms 22, 22.

From the sheaves 36, 36, the two reaches of the cable 37 extend laterally outward to and over the front portions of a pair of sheaves 38, 38, respectively, which are carried by the frame portion a near the front ends of the side rails or track elements 10, 10 thereof. Said reaches then extend over the rear portions of a pair of sheaves 39, 39, respectively, carried by the slide elements 25, 25, respectively, then forwardly over the front portions of a second pair of sheaves 40, 40, respectively, carried by the frame portion a, near the front ends of the side rails at track elements 10, 10, respectively, then rearwardly over a third pair of sheaves 41, 41, respectively, carried by the frame portion a near the rear ends of the side rails or track elements 10, 10, respectively, and then laterally inward to the drum 27, upon which they are wound in opposite directions.

From the foregoing, it will be manifest that when the slide elements 25, 25, are disposed in their rearmost positions and the arms 22, 22 are disposed in their lowered positions, and the lever 31 is in its substantially vertically disposed position, all as shown in Figure 1, rotation of the drum 27 in a direction to wind the respective reaches of the cable 37 thereof will result in shortening of the effective lengths of said reaches with the consequent effect of rotating the lever 31 in a direction to initiate forward and upward swinging movement of the arms 22, 22 and of simultaneously urging the slide elements 25, 25 forwardly to cause the arms 26, 26 to continue the forward and upward swinging movement of said arms 22, 22 after the lever 31 has been swung to its substantially horizontally disposed position. It will be equally manifest that when the arms 22, 22 are in their raised positions as shown in Figure 2, lowering of the same under the influence of gravity may readily be controlled by controlling cable-unwinding rotation of the drum 27.

Depending upon the character of the material to be handled by the machine, the load carrier C may, as aforesaid, be either in the form of a scoop or, alternatively, in the form of a rake as shown, and in either case said load carrier may be of any suitable or preferred construction. Essentially, however, said load carrier is pivoted to the arms 22, 22, as indicated at 42, for swinging movements between load gathering, elevating and dumping positions, and suitable means is provided for effecting and controlling its swinging movements relative to said arms.

One simple and practical means for effecting and controlling swinging movements of the load carrier C is illustrated in the drawings as comprising a drum 43 fixed to a shaft 44 mounted in suitable bearings 45 on the frame A, and a pair of cable reaches 46, 46 wound in opposite directions on said drum and connected to said load carrier. The drum 43 may appropriately be located rearwardly of the frame portion a' adjacent to the top and near one side thereof as shown, and the shaft 44 may extend to the rear of the machine and near its rear end may be provided with a hand-wheel 47 located within convenient reach of an operator seated upon the seat of the tractor B so that the tractor operator, by means of said handwheel, may readily rotate said shaft 44 and the drum 43 to wind the cable reaches 46, 46 into the latter and may readily control rotation of said drum to control unwinding of said cable reaches therefrom.

From the drum 43 the cable reaches 46, 46, extend laterally outward to and over a pair of guide sheaves 48, 48, respectively, carried by the top part of the frame portion a' near the sides thereof, respectively, then downwardly to and beneath a second pair of guide sheaves 49, 49, respectively, carried by the arms 22, 22, respectively, then forwardly to the load carrier C to which they are connected at points above the pivoted connections 42 of the same with the arms 22. It will be apparent, therefore, that in any position of the arm 22, 22 the drum 43 may, by means of the handwheel 47, be rotated to wind the cable reaches 46, 46 thereon to swing the load carrier C upwardly and rearwardly to a load carrying position. Likewise, it will be apparent that either by means of said hand-wheel or by means of a suitable friction brake lever 50 which preferably is associated with a brake drum 51 on the shaft 44, cable-unwinding rotation of the drum 43 may be controlled to control downward and forward or load-dumping swinging movements of the load carrier C under the influence of gravity.

When the parts of the machine are in the positions shown in Figure 1, the machine may be advanced by the tractor B to cause the load carrier C to gather a load. Thereafter the load carrier may be elevated and machine may be moved by the tractor B to a position where it is desired to stack or dump the load. The load may then be dumped and the ports of the parts of the machine may then be restored to their Figure 1 positions to repeat the load gathering, moving and dumping operations.

If the load carrier C is in the form of a rake, the tines 52 thereof may be formed from wood and may be covered by wear-resisting and reinforcing metal sheathing elements 53 as shown in Figure 7 of the drawings.

From the foregoing description considered in connection with the accompanying drawings it is believed that the construction and mode of operation of the machine will be clearly understood and its advantages appreciated. It is desired to point out, however, that while only a single specific structural embodiment of the machine has been illustrated and described, the same is readily capable of embodiment in specifically different mechanical structures within its spirit and scope as defined in the appended claims.

Having thus described my invention, what I claim as new and desire to secure by Letters Patent is:

1. A machine of the character described comprising a frame including a substantially horizontally disposed portion and an upright portion adjacent to the front end thereof, said horizontally disposed portion including a pair of laterally spaced substantially horizontally disposed track elements extending longitudinally relative thereto, a pair of laterally spaced arms pivoted at corresponding ends to said upright portion adjacent to the top thereof and swingable between downwardly and forwardly and upwardly and forwardly inclined positions relative thereto, a load carrier mounted upon the free ends of said arms, a second pair of arms slidably mounted at corresponding ends upon said track elements and pivotally connected at their other ends to said first-mentioned pair of arms, respectively, at points spaced from the pivotal connections of said first mentioned arms with the upright portion of said frame, lever means pivoted to said frame and swingable to initiate upward swinging movement of said first-mentioned pair of arms from their downwardmost positions, and drum and cable means operatively connected to said second-mentioned pair of arms and to said lever means and operable initially to swing said lever means to initiate upward swinging movement of said first-mentioned pair of arms and thereafter to effect forward sliding movement of the first-mentioned ends of said second mentioned pair of arms to continue upward swinging movement of said first-mentioned pair of arms.

2. A machine of the character described comprising a frame including a substantially horizontally disposed portion and an upright portion adjacent to the front end thereof, said horizontally disposed portion including a pair of laterally spaced substantially horizontally disposed track elements extending longitudinally relative thereto, a pair of laterally spaced arms pivoted at corresponding ends to said upright portion adjacent to the top thereof and swingable between downwardly and forwardly and upwardly and forwardly inclined positions relative thereto, a load carrier mounted upon the free ends of said arms, a second pair of arms slidably mounted at corresponding ends upon said track elements and pivotally connected at their other ends to said first-mentioned pair of arms, respectively, at points spaced from the pivotal connections of said first-mentioned arms with the upright portion of said frame, a lever pivoted intermediate its ends to said frame and swingable between upright and substantially horizontally disposed positions, said lever being disposed so that when it is in its upright position and said first-mentioned pair of arms are in their downwardmost positions its lower end is disposed to engage the rear faces of said first-mentioned pair of levers near their free ends and to initiate upward swinging movement thereof upon downward and rearward swinging movement of its upper end and consequent upward and forward swinging movement of its lower end, and drum and cable means operatively connected with the first-mentioned ends of said second-mentioned pair of arms and with the upper end of said lever and operable initially to swing said lever to initiate upward swinging movement of said first-mentioned pair of arms from their lowermost position and thereafter to effect forward sliding movement of the first-mentioned ends of said second-mentioned pair of arms along said track elements to continue upward swinging movement of said first-mentioned pair of arms.

3. A machine of the character described comprising a frame including a substantially horizontally disposed portion and an upright portion adjacent to the front end thereof, said horizontally disposed portion including a pair of laterally spaced substantially horizontally disposed track elements extending longitudinally relative thereto, a pair of laterally spaced arms pivoted at corresponding ends to said upright portion adjacent to the top thereof and swingable between downwardly and forwardly and upwardly and forwardly inclined positions relative thereto, a load carrier mounted upon the free ends of said arms, a second pair of arms slidably mounted at corresponding ends upon said track elements and pivotally connected at their other ends to said first-mentioned pair of arms, respectively, at points spaced from the pivotal connections of said first-mentioned arms with the upright portion of said frame, a lever pivoted intermediate its ends to said frame and swingable between upright and substantially horizontally disposed positions, said lever being disposed so that when it is in its upright position and said first-mentioned pair of arms are in their downwardmost positions its lower end is disposed to engage the rear faces of said first-mentioned pair of levers near their free ends and to initiate upward swinging movement thereof upon downward and rearward swinging movement of its upper end and consequent upward and forward swinging movement of its lower end, a drum carried by said main frame at the rear end thereof, sheaves operatively connected to the first-mentioned ends of said second-mentioned pair of arms, a sheave carried by the frame near the front end of each track element, a sheave carried by the upper end of said lever, a pair of sheaves carried by the frame one to either side of and below said lever-carried sheave when said lever is in its upright position, and a cable extending over said lever-carried sheave and beneath said pair of frame-carried sheaves and around the rear portions of the sheaves that are operatively connected to the first-mentioned ends of said second-mentioned pair of arms and over the sheaves at the front ends of said track elements and then rearwardly to and connected at its ends to said drum, whereby upon turning of said drum to wind the ends of said cable thereon said lever is swung to initiate upward swinging movement of said first-mentioned pair of arms and the first-mentioned ends of said second-mentioned pair of arms are moved forwardly along said track elements to continue the upward swinging movement of said first-mentioned pair of arms.

4. A machine of the character described comprising a frame including a substantially horizontally disposed portion and an upright portion adjacent to the front end thereof, said horizontally disposed portion including a pair of laterally spaced substantially horizontally disposed track elements extending longitudinally relative thereto, a pair of laterally spaced arms pivoted at corresponding ends to said upright portion adjacent to the top thereof and swingable between downwardly and forwardly and upwardly and forwardly inclined positions relative thereto, a load carrier pivotally mounted upon the free ends of said arms for upward and downward swinging movement relative to said arms, a second pair of arms slidably mounted at corresponding ends upon said track elements and pivotally connected at their other ends to said first-mentioned pair of arms, respectively, at points spaced from the pivotal connections of said first-mentioned arms with the upright portion of said frame, means for sliding along said track elements and for controlling their rearward sliding movement therealong to raise and to control lowering of said first-mentioned pair of arms and of the load carrier carried by the same, drum and cable means for effecting upward pivotal movements and for controlling downward pivotal movements of said load carrier relative to said first-mentioned pair of arms in all positions of swinging movement of the latter, said drum and cable means comprising a drum mounted on the frame, a sheave mounted on each of said second-mentioned pair of arms, and a pair of cable elements respectively connected to said load carrier above the pivotal connection of the latter with said first-mentioned pair of arms and respectively under said sheaves and wound on said drum.

5. A machine of the character described including, a frame, a tiltable load carrier pivotally connected to the frame for movement toward and away from the latter, a lever pivotally connected intermediate its ends to said frame and having one of its ends engageable with said load carrier, means for causing movement of the load carrier toward and away from said frame and having a part connected to the other end of said pivoted lever to cause the latter to initiate movement of the load carrier away from the frame when the last-named means is actuated in a direction to move the load carrier away from the frame, and means carried by the frame and connected to the load carrier for controlling the tilting movement of the latter independently of the means for causing movement of the load carrier toward and away from the frame.

6. A machine of the character described including, a substantially horizontal frame adapted to receive a tractor therein and to have the tractor connected thereto for propelling the same, an upright connected to the frame adjacent the front end thereof, a pair of spaced arms each having their upper ends pivotally connected to said upright, a load carrier pivotally connected to the lower ends of said arms, a second pair of spaced arms each having their forward ends pivotally connected to the first-named arms and having their opposite ends slidably connected to said frame, drum and cable means connected to the second pair of arms for moving the same and thereby the first-named arms and the load carrier toward and away from said frame, a lever connected to the frame and to the drum and cable means and engageable with the first-named arms for initiating movement of the latter and thereby the load carrier away from the frame when the drum and cable are actuated to move the load carrier in a direction away from the frame, and a second drum and cable means carried by the frame and connected to the load carrier for controlling the tilting movements of the latter independently of the first-named drum and cable means.

7. A machine of the character described including a frame, a vertically swinging load carrier connected to said frame for movement toward and away from the latter, actuating means for moving the load carrier toward and away from said frame, and a second means swingably connected to the frame between the frame and load carrier and independent of the load carrier for initiating loading movement of said load carrier by a forward thrust, said second means being connected to the actuating means so as to aid in initiating loading movement of the load carrier when the actuating means is moved so as to cause loading movement of the load carrier.

8. A machine of the character described in accordance with claim 7, wherein the load carrier movement initiating means includes a pair of forwardly divergent arms pivotally connected intermediate their ends to the frame.

9. A machine of the character described in accordance with claim 7, wherein the actuating means for the load carrier includes a drum and cable for effecting movement of the load carrier toward and away from said frame.

10. A machine of the character described in accordance with claim 7, wherein there is a tiltable load carrier and means for controlling the tilting movement of the load carrier relative to the frame independently of the actuating means which effects movement of the load carrier toward and away from said frame.

CHRISTIAN CHRISTIANSEN.